May 22, 1956 E. B. TOLMAN ET AL 2,746,807
APPARATUS FOR DISCHARGING PULVERULENT MATERIAL
Filed May 18, 1953 2 Sheets-Sheet 1
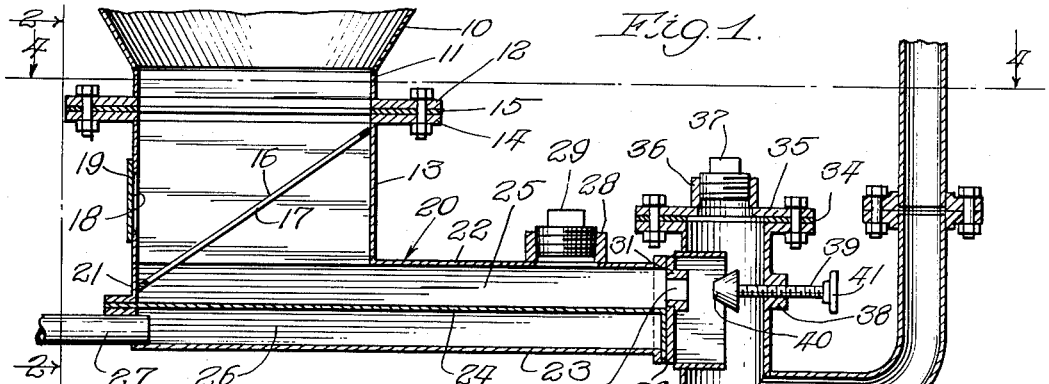
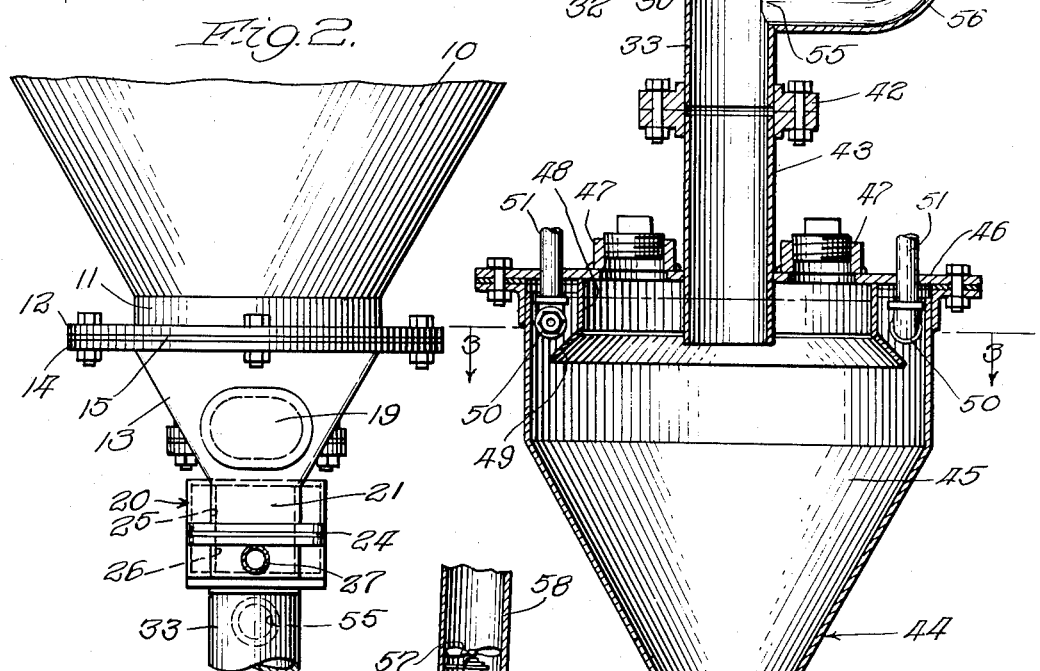
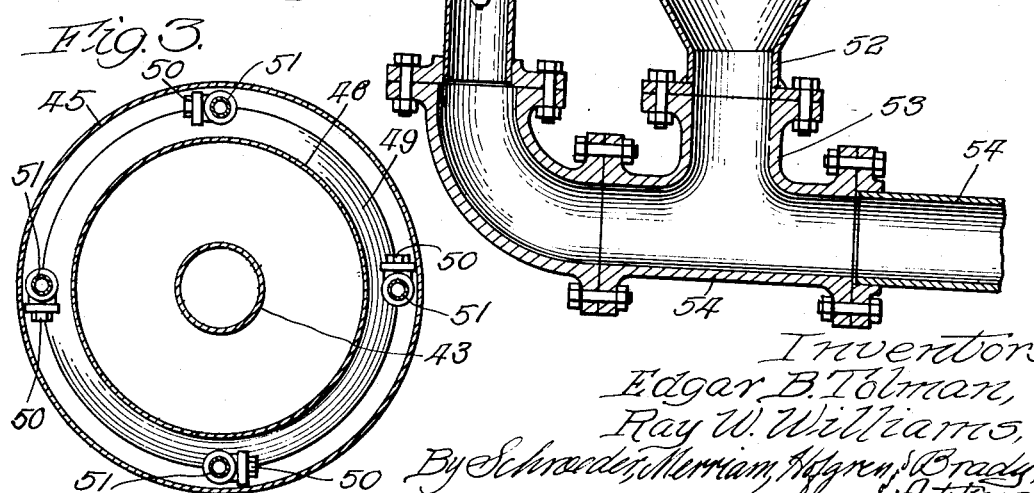
Inventors:
Edgar B. Tolman,
Ray W. Williams,
By Schroeder, Merriam, Hofgren & Brady,
Attys.

May 22, 1956  E. B. TOLMAN ET AL  2,746,807
APPARATUS FOR DISCHARGING PULVERULENT MATERIAL
Filed May 18, 1953  2 Sheets-Sheet 2
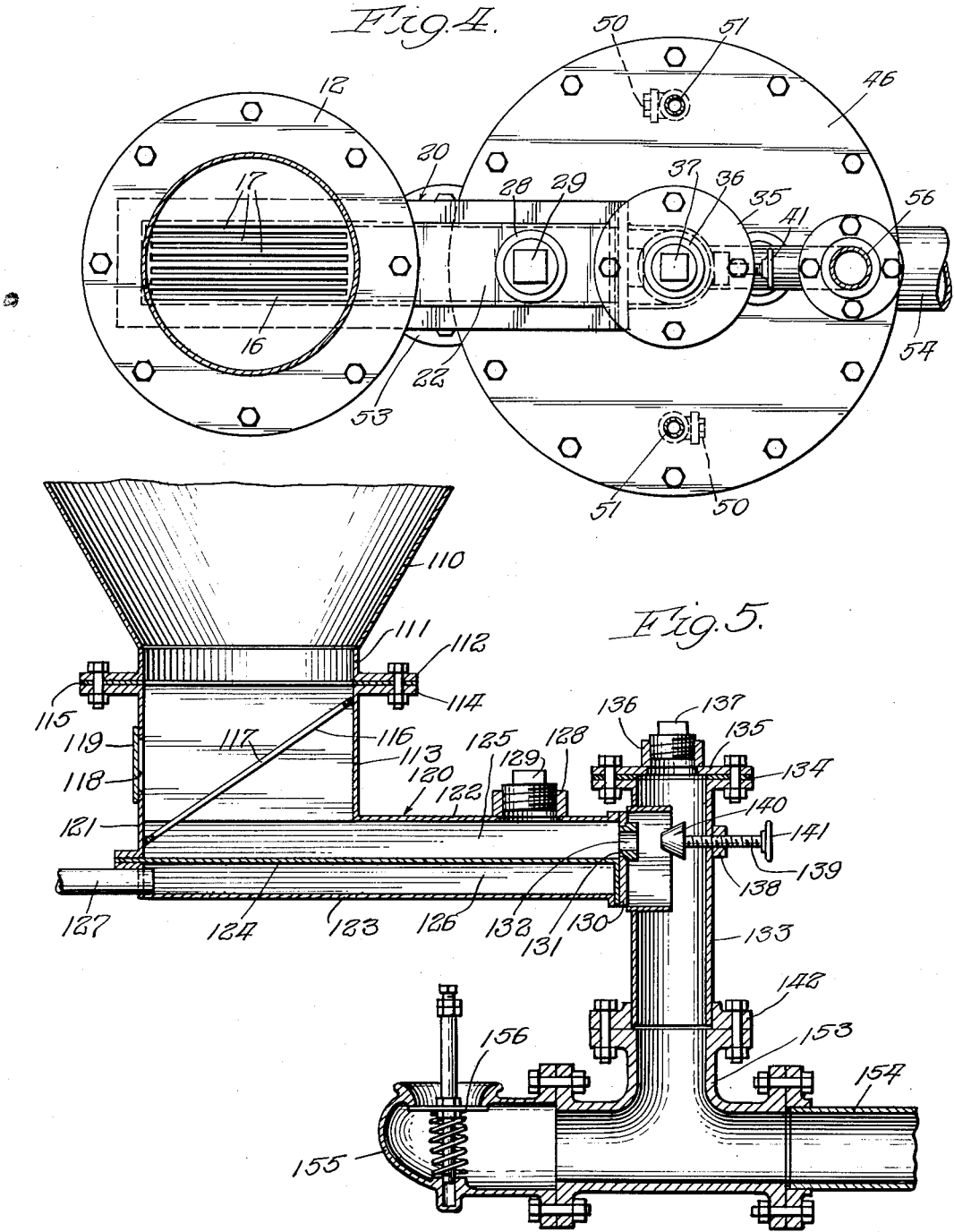
Inventors.
Edgar B. Tolman,
Ray W. Williams
By Schroeder, Merriam, Hofgren & Brady Attys.

United States Patent Office 2,746,807
Patented May 22, 1956

2,746,807

APPARATUS FOR DISCHARGING PULVERULENT MATERIAL

Edgar B. Tolman, Chicago, and Ray W. Williams, Blue Island, Ill., assignors to United Conveyor Corporation, a corporation of Illinois Application May 18, 1953, Serial No. 355,558

3 Claims. (Cl. 302—29)

This invention relates to apparatus for discharging pulverulent material from a hopper, and in particular it relates to apparatus which may be used to discharge material such as pulverized ash from a hopper into a carry-off conveyor.

The collection and disposition of the very fine pulverized ash which is the product of coal combustion in modern power plants presents a difficult problem. In the usual arrangement of such a plant there are a number of cyclone and electric precipitator collectors which collect the pulverized ash, and each of these devices is provided with a hopper for temporary storage of the ash. Heretofore the usual way of doing this has been to provide an individual branchline to each hopper with the necessary valve so that the material will be drawn from one hopper at a time; or rotary vane feeders are used to deliver the material from a number of hoppers to the conveyor line. The rotary vane feeder is expensive, requires an electric motor drive, and is subject to high maintenance. If not properly maintained, leakage of air into the pneumatic conveyor from the nearest hopper will prevent enough air passing through the conveyor at the far end to properly convey the material. A carry-off conveyor system is used to take ash discharged from the hoppers to a disposal point such as a car or truck loading dock. The conveyor system may operate either continuously or intermittently, and in either case it is desirable to draw the ash from several hoppers simultaneously so as to simplify the work of the conveyor operator, or to simplify the control equipment where automatic removal is employed.

Removal of pulverized ash is usually accomplished with fluid, either by a pneumatic system or by a water sluice system. In either case it is important that the ash be fed out of the hoppers and into the conveyor system at a controlled rate so that the total volume of material entering the conveyor system from all the hoppers is at the optimum for efficient use of the system. If the volume of material discharged from each hopper per unit time is too small the conveyor system will be more or less inefficient because it will not make full use of the volume of air or water employed; whereas if the feed is too rapid the conveyor system may be choked and break down completely.

We have invented and are here disclosing a novel combination of elements by means of which the ash from each individual hopper in a group may be fed at a carefully controlled rate so that the volume of material entering the conveyor system from each hopper in any given time is at the optimum for the conveyor system.

Two embodiments of the invention are illustrated in the accompanying drawings, one embodiment being suitable for use with a water sluice conveyor system, and the other being suitable for use with a pneumatic system. In the drawings:

Fig. 1 is a fragmentary vertical central sectional view through a feed apparatus constructed in accordance with the invention for use with a water sluice conveyor;

Fig. 2 is a fragmentary section taken as indicated along the line 2—2 of Fig. 1;

Fig. 3 is a section taken as indicated along the line 3—3 of Fig. 1;

Fig. 4 is a section taken as indicated along the line 4—4 of Fig. 1; and

Fig. 5 is a fragmentary vertical central sectional view of apparatus suitable for use with a pneumatic conveyor system.

Referring to the drawings in greater detail, and referring first to Fig. 1, the apparatus includes a storage hopper 10 to receive pulverulent material from a precipitator collector (not shown) which has at its lower end a discharge throat 11 provided with an external flange 12 to which may be bolted a tubular hopper discharge member 13 having a flange 14. A movable gate 15 may be mounted between the flanges to stop the flow of material from the hopper 10 into the hopper discharge member 13 when desired. Within the discharge member 13 is a diagonally disposed grating 16 which, as best seen in Fig. 4, consists of spaced parallel bars 17 which are designed to trap oversize pieces of material and collect them adjacent the wall of the tubular discharge member 13 where they may be removed periodically through a hand hole 18 which is provided with a removable closure 19.

Below the hopper discharge member 13 is a removal conduit indicated generally at 20, which, as best seen in Fig. 2, is preferably rectangular in cross section and which has an end wall 21 which is common with a portion of the wall of the discharge member 13. The removal conduit 20 is substantially horizontal, and specifically must have a pitch smaller than the angle of repose of the pulverulent material in the hopper so that material in the conduit will not be continuously discharged by gravity flow. Intermediate between an upper wall 22 and a lower wall 23 of the removal conduit 20 is a transversely disposed, continuous porous partition 24 which divides the conduit into an upper material conveying portion 25 and a lower air delivery tube 26. An air line 27 communicates with the air delivery tube 26 in order to supply air under pressure to the latter from an air compressor (not shown). Thus, the removal conduit 20 is of the well-known "fluidizing" type in which the compressed air in the air delivery tube 26 seeps through the porous partition 24 in sufficient quantity to fluidize the pulverulent material in the material conveying portion 25 of the conduit so that the "fluidized" material may flow much as does a stream of water. In the upper wall 22 of the removal conduit 20 is an inspection port 28 provided with a closure 29.

At the end of the removal conduit 20 opposite the hopper discharge member 13 is an end plate 30 which has at the end of the material conveying portion 25 of the conduit an opening to receive an annular material metering member 31 the orifice 32 of which is of suitable size to permit the passage of the maximum volume of pulverulent material which it is desired to feed out of the material conveying portion 25 in any given period of time. The metering member 31 is removably mounted so that a standard removal conduit 20 may be used in installations of various capacities, and the maximum discharge rate from the removal conduit 20 may be varied to suit individual conditions by using a metering member 31 of the proper capacity.

Secured to the end plate 30 of the removal conduit 20 is a vertically disposed gravity discharge pipe 33 through which material passing through the metering member 31 may enter a carry-off conveyor system. At the upper end of the discharge pipe 33 is a flange 34 to receive a cap plate 35 having a threaded collar 36 which serves as an inspection port for the discharge pipe 33 and which is provided with a screw closure 37.

In the wall of the discharge pipe 33 directly opposite the metering member 31 is an aperture surrounding which is a threaded boss 38 to receive the threaded stem 39 of a needle valve 40 which has an adjusting handle 41 outside the discharge pipe. Thus, the capacity of the metering member 31 may be reduced from the maximum allowed by reason of the size of the orifice 32 by setting the needle valve 40.

At the bottom of the discharge pipe 33 is a flange 42 by means of which the lower end of the discharge pipe 33 may be secured to the upper end of a feed pipe 43 for a conveyor system, indicated generally at 44.

In the embodiment of the invention illustrated in Figs. 1–4, the conveyor system 44 is of the water sluice type, and the feed pipe 43 opens into a mixing chamber 45 which has at its upper end a closure 46 provided with a pair of inspection ports 47. Depending from the closure 46 and surrounding the lower end of the feed pipe 43 is an annular baffle 48 having at its lower end a flared skirt 49. Positioned outside the annular baffle 48 are water jets 50 provided with pipes 51 through which they receive water under pressure from a source of supply (not shown). The jets 50 are tangential to the wall of the mixing chamber 45, and in the operation of the mixing chamber water from the jets is thoroughly mixed with ash entering the chamber through the feed pipe 43 so that the ash is sluiced out the open bottom 52 of the mixing chamber and into an intake pipe 53 for a sluice type carry-off conveyor 54.

In the use of a water sluice conveyor in combination with a hopper discharge such as is here disclosed it is absolutely essential that moist air from the mixing chamber not be permitted to feed back into the discharge pipe 33 and the metering member 31, because moist air in that area will build up a coating of ash which will rapidly choke the metering member and the discharge pipe. To accomplish this, pressure in the feed pipe 43 and mixing chamber 45 must be kept lower than the pressure in the precipitator which feeds into the hopper 10, and a stream of hot, dry gas is drawn through the feed pipe and chamber. In order to do this the wall of the discharge pipe 33 below the metering member 31 is provided with an aperture 55 to receive a hot gas delivery pipe 56 which communicates with a source of hot gas (not shown). Hot gases pass through the pipe 56 into the discharge pipe 33 at a high enough rate to prevent any moist air from going out of the top of the mixing chamber 45 through the feed pipe 43, being drawn through said pipes and the mixing chamber 45 into the carry-off conveyor conduit 54, by means of an exhaust fan 57 in a hot gas vent stack 58. Alternatively, the fan 57 may be eliminated and the hot gas vent stack 58 may be connected to the inlet of the induced draft fan for the boiler, where the pressure is necessarily lower than in the precipitator.

The embodiment of the invention illustrated in Fig. 5 is identical with that shown in Figs. 1–4 from the hopper 10 to the bottom flange 42 on the discharge pipe 33, and operates in precisely the same way. Accordingly, in Fig. 5 all the elements up to that point are numbered the same as the corresponding elements in Figs. 1–4, but 100 numbers higher.

Secured directly to the flange 142 at the lower end of the discharge pipe 133 is an intake pipe 153 for a pneumatic carry-off conveyor 154. In this type conveyor the ash or other pulverulent material is moved in a stream of air set up by a vacuum pump, or blower. Secured adjacent the intake pipe 153 is an air intake valve 155 which is provided with a check valve 156 of conventional construction through which air may enter the pneumatic conveyor conduit 154 when the vacuum pump or blower for the pneumatic conveyor is in operation. Since this type carry-off conveyor requires no water, no hot gas blast is required.

The foregoing detailed description is given for clearness of understanding only and no unnecessary limitations are to be understood therefrom, as some modifications will be obvious to those skilled in the art.

We claim:

1. Apparatus for feeding pulverulent material in controlled volume from a storage hopper discharge to a water sluice type conveyor for carrying off said material, comprising: a conduit which has one end beneath the storage hopper discharge, said conduit being pitched at an angle less than the angle of repose of the pulverulent material in the hopper; a transversely disposed, continuous porous partition which divides said conduit into an upper material conveying portion and a lower air delivery tube; means for supplying air under pressure to said air delivery tube to fluidize pulverulent material in said material conveying portion; a discharge pipe to receive fluidized material from said material conveying portion; a mixing chamber to receive pulverulent material from said pipe and mix said material with a water sluice stream in which it may be carried off; hot gas delivery means adapted to provide a continuous stream of hot gas through said discharge pipe and said mixing chamber to prevent flow of moist air or material from said mixing chamber into said pipe; and metering means between said material conveying portion and said discharge pipe to limit to a predetermined maximum the volume of fluidized material which may enter the discharge pipe per unit time.

2. The apparatus of claim 1 in which the hot gas delivery means includes a gas outlet provided with an exhaust fan to draw hot gas through the mixing chamber.

3. Apparatus for feeding pulverulent material in controlled volume from a storage hopper to a carry-off conveyor, comprising: a hopper discharge member having an upright side wall provided with a clean-out opening; a movable closure in said opening; a substantially horizontal conduit which has one end beneath said hopper discharge member; a transversely disposed, continuous porous partition which divides said conduit into an upper material conveying portion and a lower air delivery tube; means for supplying air under pressure to said air delivery tube to fluidize pulverulent material in said material conveying portion; a gravity discharge pipe through which fluidized material from said material conveying portion may pass to a carry-off conveyor; metering means between said material conveying portion and said discharge pipe to limit to a predetermined maximum the volume of fluidized material which may enter the discharge pipe per unit time; and a fixed grating in the hopper discharge member to screen out of the conduit material large enough to clog said metering means, said grating having parallel bars which are inclined downwardly toward the clean-out opening and terminate close to the lower margin of said opening, whereby material retained by the grating collects adjacent the opening for easy removal from the hopper discharge member.

References Cited in the file of this patent

UNITED STATES PATENTS

| | | |
|---|---|---|
| 415,750 | Vaile | Nov. 20, 1889 |
| 1,852,535 | Moore | Apr. 5, 1932 |
| 1,896,597 | Smith | Feb. 7, 1933 |
| 2,021,171 | Buck | Nov. 19, 1935 |
| 2,430,278 | Daniels | Nov. 4, 1947 |
| 2,657,100 | Weller | Oct. 27, 1953 |